July 4, 1950 M. F. HORTON 2,513,873
UNDER BENCH SAW FOR CUTTING VARIOUS SECTIONS OF WOOD
Filed April 6, 1946 4 Sheets-Sheet 1
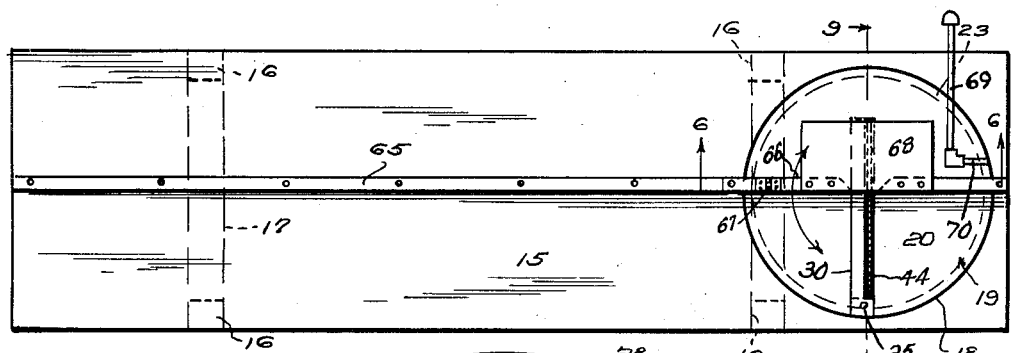
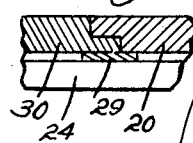
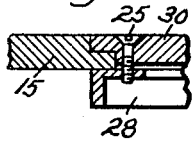
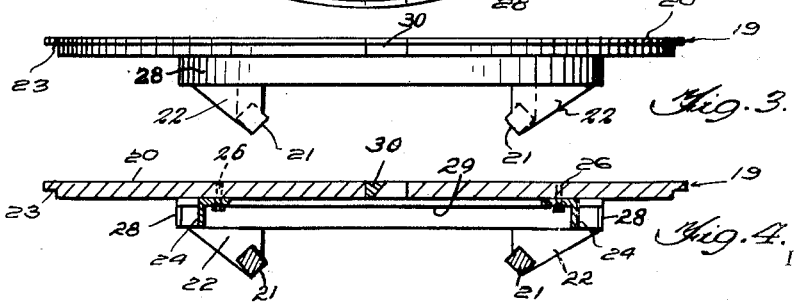
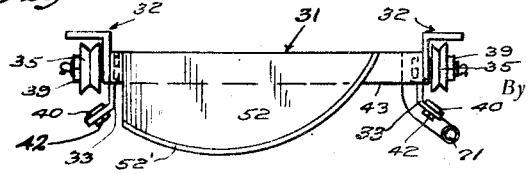
Inventor
Malcolm F. Horton,
By Clarence A. O'Brien
and Harvey B. Jacobson
Attorneys

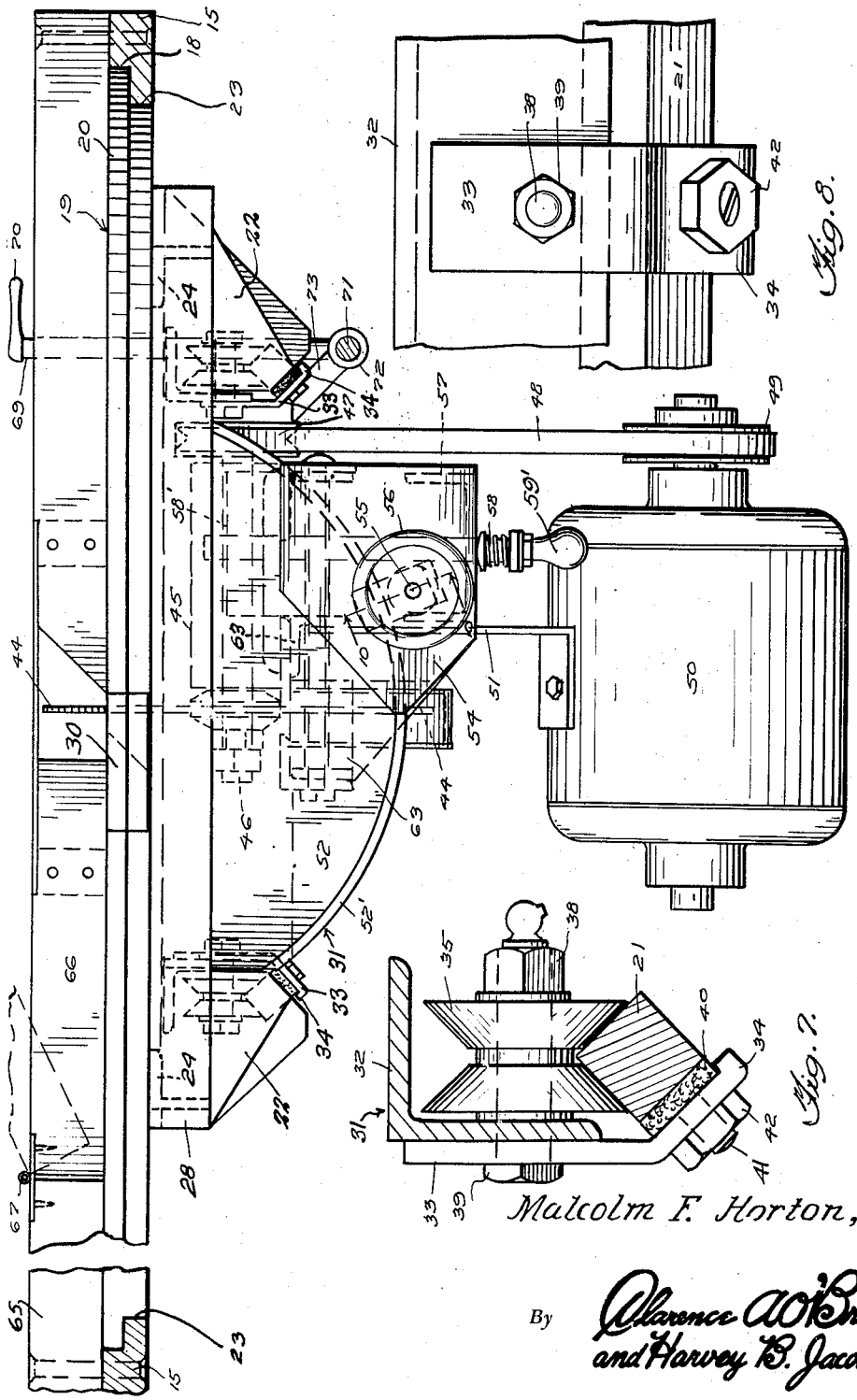

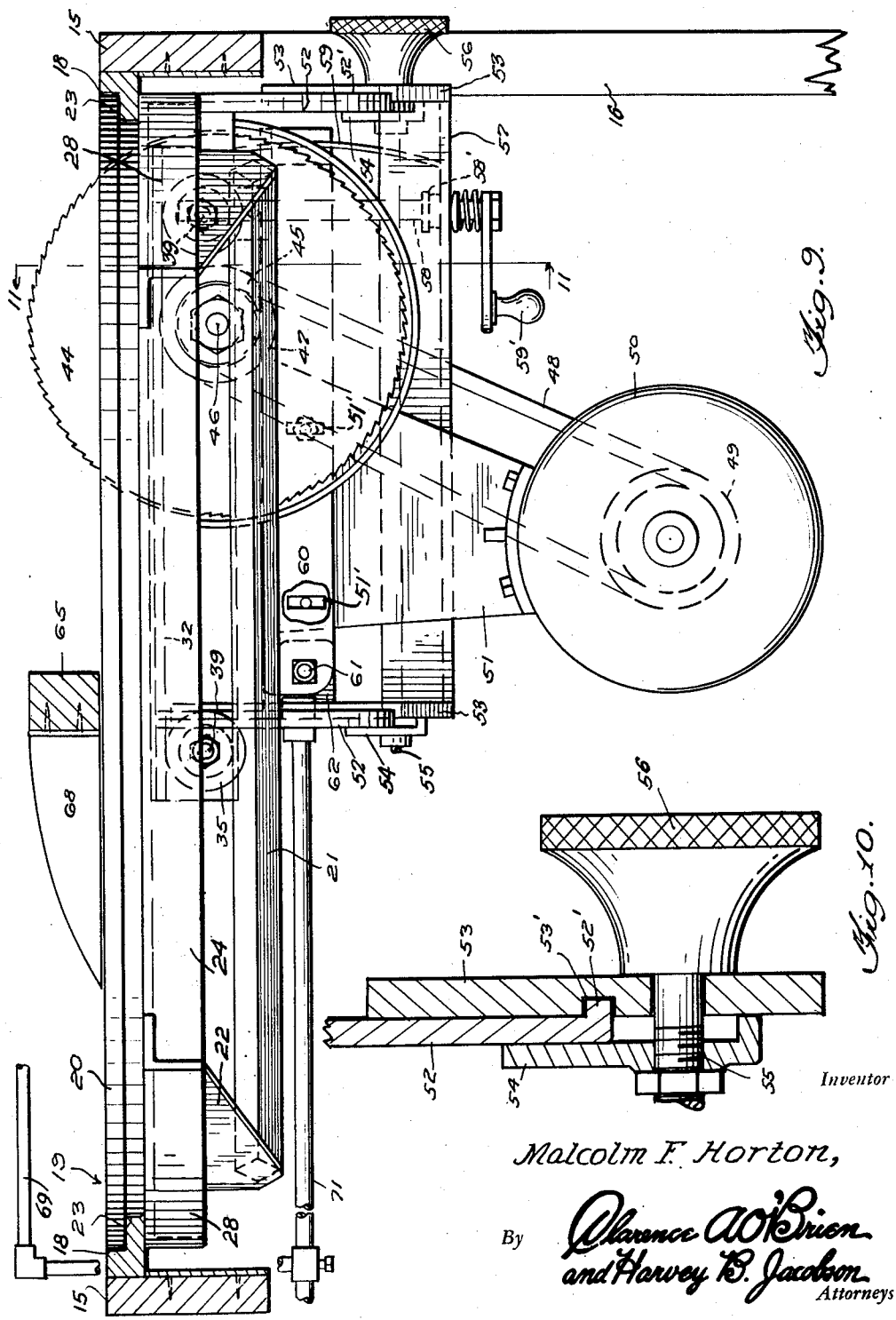

July 4, 1950 M. F. HORTON 2,513,873
UNDER BENCH SAW FOR CUTTING VARIOUS SECTIONS OF WOOD
Filed April 6, 1946 4 Sheets-Sheet 4

Inventor
Malcolm F. Horton,
By Clarence A. O'Brien
and Harvey B. Jackson
Attorneys Patented July 4, 1950

2,513,873

UNITED STATES PATENT OFFICE 2,513,873

UNDER BENCH SAW FOR CUTTING VARIOUS SECTIONS OF WOOD

Malcolm F. Horton, Goldthwaite, Tex.

Application April 6, 1946, Serial No. 660,197

1 Claim. (Cl. 143—6)

This invention relates to improvements in bench saws, and more particularly to an under bench saw, in which a power saw is mounted and operates under a bench, so as to travel back and forth for cross-cutting with sufficient travel to cut various sections of wood, to tilt to any angle from 90° through 45° and at the same time may be rotated in an angle of 360° for cross-cutting long boards at any angle and for ripping long boards.

Another object of the invention is to provide an under bench power saw in which a motor driven saw is mounted upon a circular rotatable support at one end of a bench provided with means for moving the same back and forth and setting the same at any desired angle between 90 and 45° and at the same time rotated through an arc or circle of 360° for cross-cutting long boards at any angle, or used for ripping long boards, and so that various stock materials may be used to manufacture the same with bearings permitting its easy manipulation to efficiently and quickly cut wood as desired for construction and other work.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of a universal under bench saw constructed in accordance with the invention.

Figure 2 is a bottom plan view of the rotating table provided for the saw.

Figure 3 is an edge view of the device shown in Figure 2.

Figure 4 is a sectional view taken on the line 4—4 of Figure 2.

Figure 5 is an end view of a carriage employed in connection with the device.

Figure 6 is an enlarged fragmentary sectional elevation showing the carriage mounted in position.

Figure 7 is an enlarged vertical sectional view showing the manner of supporting the carriage.

Figure 8 is an end view of the device shown in Figure 7 looking toward the right.

Figure 9 is a vertical sectional view at right angles to Figure 6.

Figure 10 is an enlarged fragmentary vertical sectional view showing the manner of slidably supporting and clamping the saw unit in position.

Figure 13 (Sheet 1) is a sectional detail view showing a part of the table clamp assembly, and Figure 14 is an enlarged sectional view taken on the line 14—14 of Figure 2 and in the direction of the arrows.

Figures 11, 12:
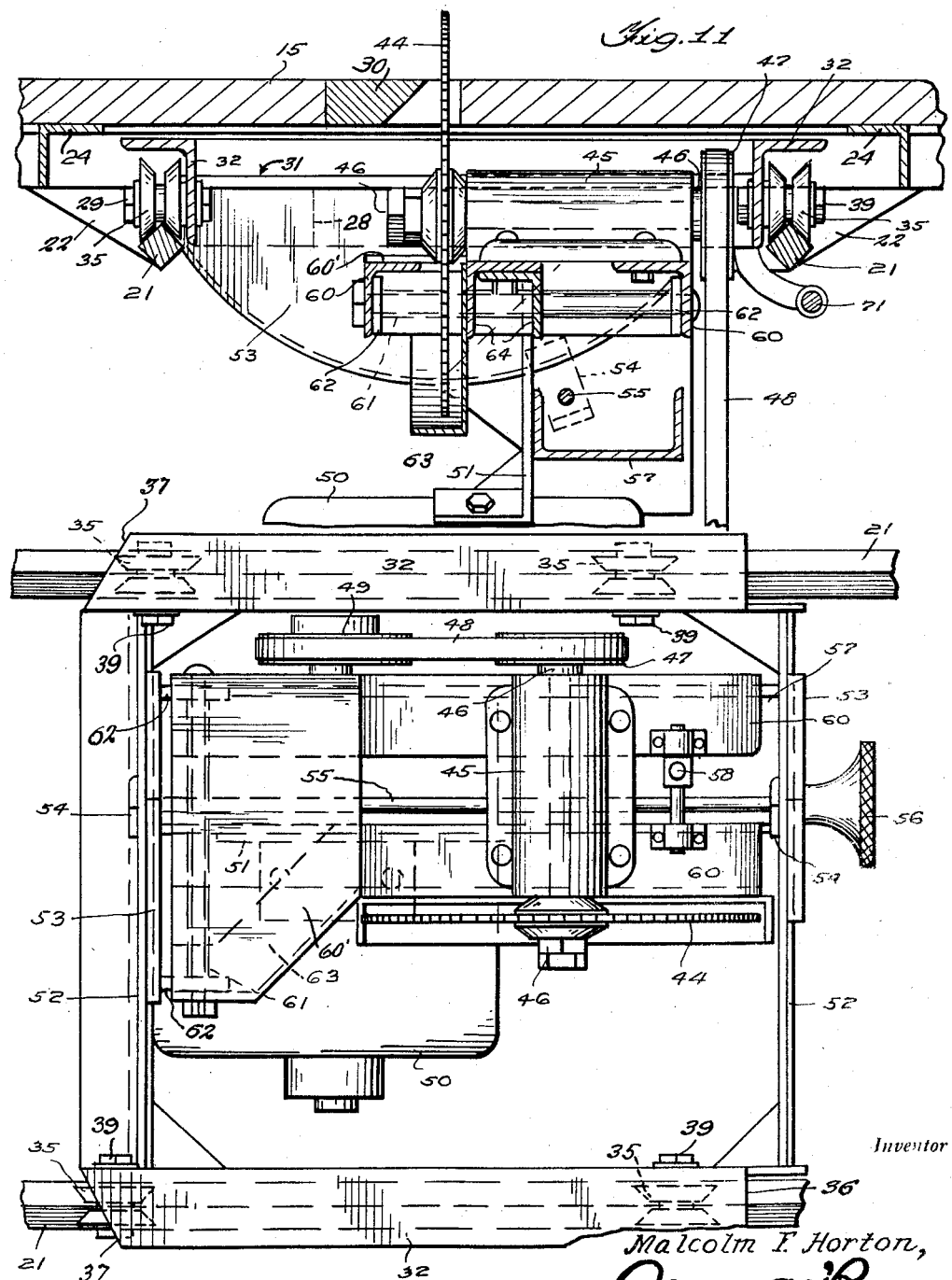
Figure 11 is an enlarged vertical sectional view taken at right angles to Figure 9, on line 11—11.
Figure 12 is a plan view of the structure shown in Figure 11, and as seen in Figure 9 with the table omitted.

Referring to the drawings in detail, in which like characters of reference designate corresponding parts throughout the several views, the universal under bench saw is shown applied to a bench 15 of elongated form supported on legs 16, said legs being connected by cross-braces 17 and adapted to fold under the table or bench. At one end of the bench, the latter is provided with a circular opening 18 recessed in stepped relation to receive a rotatable circular table 19 designed to turn in a complete circle or an angle of 360°. This table comprises a top 20 provided with a spaced parallel pair of runners 21 on the under side thereof made of square shafting set with corners upwardly and suspended by strap irons 22 from beneath a lower portion of the table offset inwardly as at 23 (see Figure 9), the strap irons being welded to angle irons 24. These angle irons are bolted to the circular table top 20 made of hard ply wood or other suitable material, with a one-half inch offset around the edge thereof and mated to the corresponding offset recess in the top of the bench, a full circle or 360°. A clamp or screw 25 is provided to lock the table top in position. On saws designed for an 8" blade, the diameter of the circular table is 30" and works in an opening 32" in diameter with a bench about 10" long, although these dimensions are not restricted, and may be changed or altered according to the requirements. The strap irons 22 (Figures 3 and 4) are welded to the runners or tracks 21 and the angle irons 24 are bolted to the table top 20 as indicated at 26. Curved angle irons 28 are secured to the bottom surface of the circular table 19 to give added support to the circular table top. A strap iron 29 extends horizontally between the tracks or angle irons 24 and serves as the brace and support for a throat block 30 also fastened to the top. The offset 23 serves as a support for the entire table top unit 19 as it rests upon the mated offset in the bench or table for the full 360° or circle to be locked in position by the clamp or screw 25 between block 30 and angle iron 28 to clamp the same together as seen in Figure 13.

Another unit of the device is a carriage unit 31 consisting of an angle iron frame 32 with the flanges extending vertically at the inside and horizontally outwardly and having vertically adjustable bearing brackets 33 on the frame 32 which are bent outwardly at their lower ends as at 34 to engage the tracks or runners 21 of rectangular cross-section supported with the corners upwardly as heretofore described. Bearings support rollers 35 of V-form adapted to run on the tracks or runners 21 as more particularly shown in Figure 7 of the drawings. These rollers are supported beneath the flanges 32, which have end portions thereof cut out as indicated at 36 and 37, Fig. 12, suitable adjustable bearings being disposed on the axles 38 of the rollers as indicated at 39 to permit easy movement thereof without undue friction. Fiber slides 40 are held in position by bolts 41 and are adjustably mounted by nuts 42 to prevent shimmy of the carriage. They may be located in any convenient position. The side 43 (Fig. 5) of the carriage is made of strap iron instead of angle iron to provide forward clearance for the saw indicated at 44 journaled in a bearing 45 and mounted on a shaft 46 carrying a pulley 47 by which it is driven from a belt 48 trained thereon and around a pulley 49 on an electric motor 50 supported by a hanger 51 from carriage 31. Fragmentary guides 52 of segmental form (Figs. 5 and 6) having a flange or rim 52' around the circumferential portion thereof, provide a method of locking the unit of the motor with the unit of the table at any desired angle when turned thereon between 90 and 45°. The motor and mandrel supported by the hanger 51 have side plates 53 grooved at 53' (Fig. 10) on the same radius as the guides 52 and designed to take the flanges or lips 52' thereof, which fit into the spaces between the plates 53 and the jaws 54 of a clamp connected by a rod 55 and operable by a hand wheel 56 to clamp the saw unit in position. A channel iron 57 (Figures 6, 9 and 11) connects the plates 53, said channel being disposed with its open side upward and its flanges extending upwardly with the connecting portion or web of the channel disposed downwardly and engaged by a vertical adjusting screw 58 engaging nut 58' carried by and between levers 60 (see Figure 12) and turned by a handle 59' for raising and lowering the saw. A curved strap iron 59 mounted on the channel 57 serves to prevent shimmy of the plates and saw unit when clamped in position. The motor 50 is suspended from angle irons or levers 60 pivoted at 61 in brackets 62 carried by a plate 63 adjacent thereto, so as to adjust the saw up and down and also take up the slack in the belt 48. As before stated, the plates 53 may be turned in the segmental flanged plates 52 as guides, to set the saw at the desired angle or radius. A double bend in the angle iron or lever 60, indicated at 63 (Fig. 12) near the saw, gives a greater distance between the hinge points or pivots 61, the saw being fixed to shaft 46 journalled in bearing 45 mounted on the angle iron levers 60 to move up and down therewith for adjustment by the screw 58 as described and levers 60 are connected across the top at the pivot end by the plate 60' and the angle bar levers 60 carry the angle irons 64 adjustably suspending a hanger 51 which supports the motor 50 the levers 60 thus being reenforced intermediately by angle irons 64 (see Figure 11). Slots are provided in hanger 51 as indicated at 51' to adjust the belt tension. Also, the saw unit is lifted from the table merely by loosening the hand wheel 56 to release the clamps 54 which normally hold the saw unit in position.

The bench or elongated rectangular table 15 (Fig. 1) may be provided as a standard work bench with the rotatable table or circular support for the saw in position to be turned as described, and provided with a removable crosscut guide 65 running centrally and longitudinally thereof with a section 66 hinged thereto as at 67, so as to lift the same out of position, or this may serve as a rip guide; or any other suitable form of rip guides, for ripping lumber longitudinally or lengthwise, may be provided. This guide may be braced as by a guard 68 (see Fig. 9 also). Also, the movable carriage 31 may be operated to move on tracks or runners 21 by an inverted L-shaped member 69 having a handle grip 70 for this purpose above the bench, said arm 69 being operatively connected at its lower end to the outer end of an adjusting rod 71 extending horizontally beneath the table and a track 21 and attached at and supported by an arm 73 depending from the carriage 31 to move the same in either direction as more particularly shown in Figures 6 and 11 of the drawings.

The unit is light and compact and may be easily handled to cut the wood conveniently under the bench operated by the motor or other power, and to permit the same to travel back and forth for cross-cutting with sufficient travel to cut a 2' x 12', and to tilt at any angle from 90° through 45° and at the same time to be rotated through an angle of 360° for cross-cutting long boards at any angle and for ripping long boards.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

A universal under bench saw including a bench, said bench having an opening therein, a table rotatably mounted in the opening, horizontally aligned tracks beneath the table, a carriage having rollers movably mounted upon said tracks, means for adjusting the carriage horizontally from above the bench, a saw unit detachably suspended beneath said carriage for angular adjustment laterally, a saw rotatably carried thereby, a motor supported beneath said carriage in the saw unit and having drive connection with the saw, said saw unit having side plates, a lever pivoted thereto at one end and supporting a saw, means for adjusting said lever to raise or lower the saw, a motor supported beneath said carriage in the saw unit and having a belt driven connection with the saw, movement of said lever serving to tighten said belt, clamping jaws cooperating with said plates, means for clamping said saw unit between said plates and jaws or for releasing the same, means for adjusting said table in an angle of 360° and means for adjusting the saw unit angularly with respect to the table.

MALCOLM F. HORTON.

REFERENCES CITED

The following references are of record in the file of this patent:

UNITED STATES PATENTS

| Number | Name | Date |
|---|---|---|
| 366,633 | Mackintosh | July 12, 1887 |
| 1,319,272 | De Mars | Oct. 21, 1919 |
| 1,816,069 | Bennett | July 28, 1931 |
| 2,121,069 | Collins | June 21, 1938 |
| 2,294,272 | Boice | Aug. 25, 1942 |
| 2,313,617 | Bray | Mar. 9, 1943 |

FOREIGN PATENTS

| Number | Country | Date |
|---|---|---|
| 15,177 | Great Britain | July 1, 1913 |